United States Patent [19]

Galloway

[11] 3,714,540

[45] Jan. 30, 1973

[54] ISOLATION AND TRANSFORMING CIRCUIT

[75] Inventor: James H. Galloway, New Baltimore, Mich.

[73] Assignee: Oxy Metal Finishing Corporation, Warren, Mich.

[22] Filed: Nov. 10, 1970

[21] Appl. No.: 88,340

[52] U.S. Cl. ......................321/2, 307/233, 307/271, 330/10, 324/118

[51] Int. Cl. ..............H02m , H03k 5/20, G01r 19/22

[58] Field of Search..............307/296, 271, 297, 233; 321/25, 18, 38; 328/140; 324/120, 118; 332/18, 19; 330/10

[56] References Cited

UNITED STATES PATENTS

| | | | |
|---|---|---|---|
| 3,525,032 | 8/1970 | Torok | 321/38 X |
| 3,430,125 | 2/1969 | Povenmire et al. | 330/10 X |
| 3,537,022 | 10/1970 | Regan | 330/10 |
| 3,566,283 | 2/1971 | Diebler | 307/271 |
| 3,271,700 | 9/1966 | Gutzwiller | 307/271 |
| 3,308,398 | 3/1967 | Chilton | 332/18 |

*Primary Examiner*—William H. Beha, Jr.
*Attorney*—Harness, Dickey & Pierce

[57] ABSTRACT

A combination isolating and transforming circuit which consists primarily of three sections, a peak current limiting section and current and voltage isolation sections which electrically isolate the control circuit from the circuit being monitored. The input from the circuit to be measured, either from a bus bar or from a shunt resistor, drives an operational amplifier which controls a variable frequency oscillator. The pulses from this oscillator drive a single-shot multivibrator, the output of which is fed back to the operational amplifier as a negative feedback system.

The operational amplifier, in turn, changes its output to adjust the frequency of the oscillator so that duty cycle of the output of the multivibrator has an on-off ratio as a function only of the input signal to the circuit. As this multivibrator switches positive and negative, the pulses are coupled through a pulse transformer to the non-isolated portion of the circuit. This latter circuit includes a flip flop which is driven to follow the multivibrator to produce the same duty-cycle signal in the output circuit as was generated in the circuit electrically connected to the load.

The output circuit includes a second operational amplifier which scales and averages this duty-cycle signal and recreates a direct current signal proportional to the incoming voltage. The circuit thus results in a conversion from a voltage to a duty cycle and back to a voltage with very low drift.

20 Claims, 4 Drawing Figures

INVENTOR.

James H. Galloway

BY

Harness, Dickey & Pierce

ATTORNEYS.

INVENTOR.
James H. Galloway
BY
Harness, Dickey & Pierce
ATTORNEYS.

INVENTOR.
James H. Galloway
BY
Harness, Dickey & Pierce
ATTORNEYS

ISOLATION AND TRANSFORMING CIRCUIT

BACKGROUND AND SUMMARY OF THE DEVELOPMENT

This invention relates generally to an isolation circuit and more particularly to an interconnection system between a circuit to be controlled and the control circuit whereby the signals produced at the circuit to be controlled are electrically isolated from the control circuit.

In many electrical circuits in which a load circuit is adapted to utilize electrical energy, it is necessary to control the voltage or current level being supplied to the load or the current density. In the past, it has been common to interconnect the control circuit directly to the load circuit being controlled thereby introducing certain errors into the control circuit. It has been found that the aforementioned errors necessitate the isolation of the control circuit from the circuit to be controlled and this problem becomes particularly acute in relatively high voltage circuits.

Previous systems have been evolved for isolating the control circuit and one such system utilized a transductor to affect the isolation, the transductor operating on a principle of relative saturation of the magnetic material of the transductor device in response to the current level flowing in the load circuit. However, transductor devices are relatively expensive, are not sufficiently stable for precise control and involve certain other inherent defects due to the magnetic characteristics of the device. For example, a transductor circuit in use depends on deriving a fairly high current across a measuring shunt and across the output bus bars. In lower current systems, an inaccuracy is introduced into the transductor system due to its lower limit of operation. When the current is derived from a measurement shunt, lower current level systems create inaccurate measurements. If the measurement is taken directly from the output conductors the current must be driven through a dropping resistor which creates waste of electrical energy and excessive heat problems.

The system of the present invention utilizes substantially all electronic circuitry which is inexpensive to manufacture, extremely stable in operation and utilizes low current levels. The system utilizes a principle of conversion from voltage to frequency to voltage with very low drift.

The system of the present invention consists generally of three sections, the first being a peak-limit section which derives incoming signals from current transformers, a voltage isolation circuit deriving an input signal from a connection to the bus and a current isolation circuit is derived from a shunt measurement device.

The peak-current limiting section is disclosed in detail in copending application Ser. No. 5,069, having a filing date of Jan. 22, 1970 and entitled Peak Current Limiting System, the disclosure of which is incorporated herein by reference.

Basically, the two isolator circuits for current and voltage isolation are identical except for scaling. Particularly, the applied input signal appears at the input circuit of an integrated circuit interconnected as a voltage regulator, the other input to the integrated circuit being supplied with a signal from the negative power supply. The output of the integrated circuit regulates the frequency of a relaxation oscillator formed by a transistor and a programmable unijunction transistor, the reference level of the programmable unijunction transistor being set by the emitter voltage of the transistor which provides a high impedance reference before triggering. After the programmable unijunction transistor triggers and pulls the emitter electrode of the transistor negative, a low impedance is provided through the collector resistance connected to the collector electrode of the transistor. This configuration increases the holding current of the programmable unijunction transistor which allows this latter transistor to shut off and continue as a relaxation oscillator.

The oscillator operates at a frequency range chosen to be between 2,000 and 4,000 Hertz depending on the output level of the integrated circuit described above. The output pulse from the programmable unijunction transistor is coupled to a single-shot multivibrator which creates a constant-width pulse at the output of the multivibrator. Circuit elements are provided to close the feedback loop to the integrated circuit, the feedback to the integrated circuit being switched between the positive supply and off. Thus, the output of the integrated circuit seeks a level such that the duty cycle derived from the single-shot multivibrator is determined by the frequency of the oscillator. Thus, as the input on the current isolator goes from zero to a preselected maximum level, the frequency of the oscillator swings from 2,000 to 4,000 Hertz. The output pulses from the single-shot multivibrator are coupled through a pulse transformer to provide electrical isolation and couples the signal to the non-isolated section of the circuit. For purposes of this discussion, non-isolation is the relation of the section relative to the control circuitry.

Thus, a system has been evolved, having a section with the sensed signal which is isolated totally from the line and the remainder of the control circuitry and includes an independent power supply. The reference in the integrated circuit regulator serves to control both the positive and negative supplies for the circuit just described.

The system includes three identical power supplies, one in each isolated portion and one common power supply for the non-isolated section. The non-isolated section is formed by a diode bridge and an integrated circuit formed as a voltage regulator.

Accordingly, it is one object of the present invention to provide an improved isolation interconnecting system for closing the feedback loop between the output load circuit and the control circuit.

It is another object of the present invention to provide an improved isolation circuit which incorporates the principle of utilizing frequency to duty-cycle conversion.

It is still another object of the present invention to provide an improved isolation circuit which converts an input signal from a particular electrical characteristic level to a frequency and then converts the frequency to a duty-cycle signal which is reproduced in a non-isolated section of the system.

It is still a further object of the present invention to provide an improved system for avoiding the problems attendant with electrically connecting a control circuit with an output power circuit wherein the control circuit is controlling the power being supplied to the load.

It is still a further object of the present invention to provide an improved voltage to duty-cycle conversion system particularly for use in connection with an isolation circuit.

It is still a further object of the present invention to provide an improved frequency to duty-cycle conversion system particularly for use in an isolation circuit.

It is another object of the present invention to provide an improved voltage to frequency to duty-cycle conversion circuit for use in an isolation circuit of the type described.

It is still another object of the present invention to provide an isolation circuit having improved linear characteristics.

It is still a further object of the present invention to provide an improved isolation circuit having improved drift characteristics.

It is still another object of the present invention to provide an improved isolating and transforming circuit which is low in cost, reliable in operation and which solves the aforementioned problems.

It is another object of the present invention to provide an improved regulated power supply system.

Further objects, features and advantages of this invention will become apparent from a consideration of the following description, the appended claims and the accompanying drawings in which:

Figure 1:
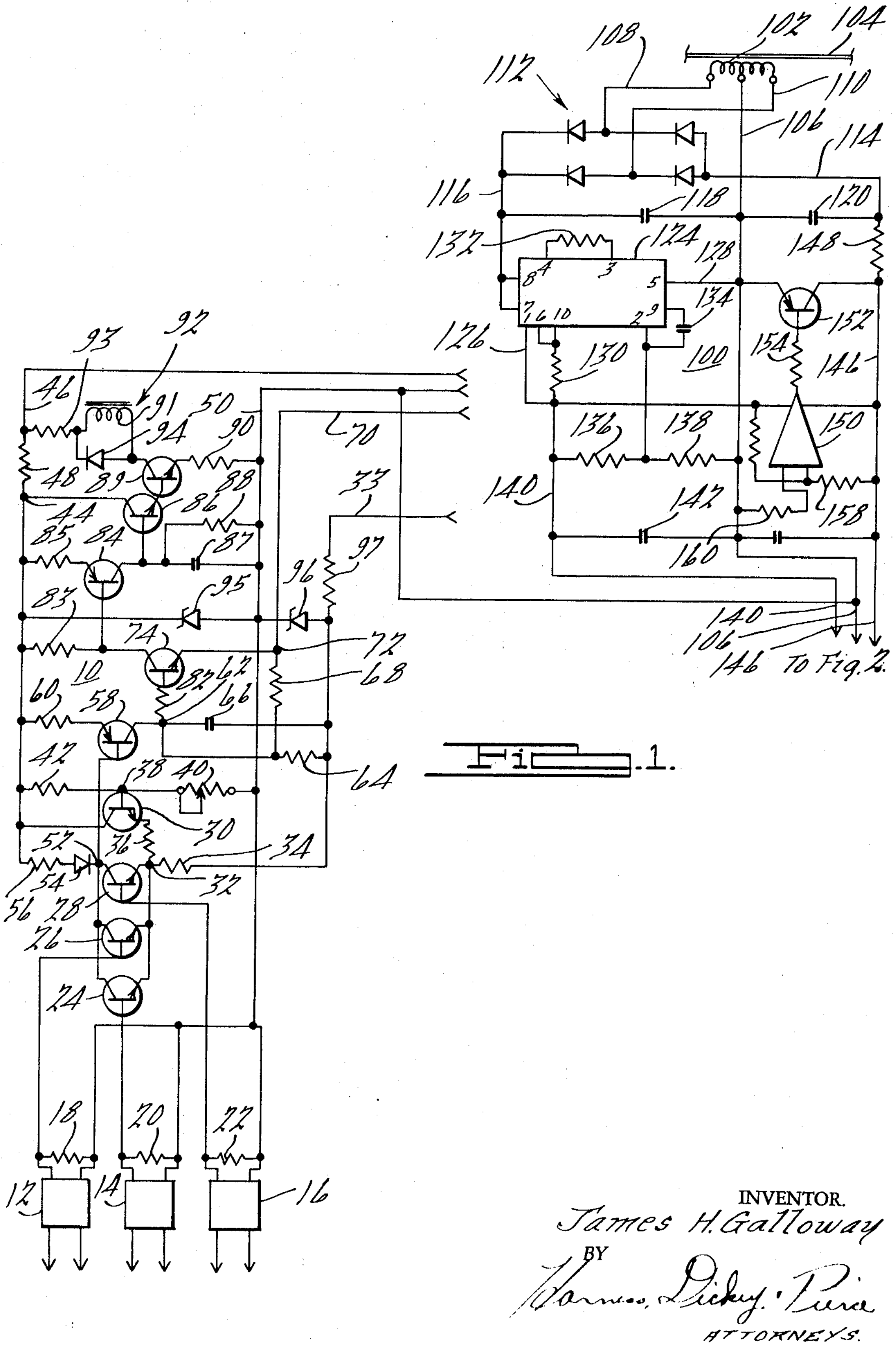
FIG. 1 is a schematic diagram illustrating the peak-current limit section which is adapted to be utilized with the system of the present invention and a common power supply system utilized with the schematic diagrams illustrated in FIGS. 2 and 3.

Referring now to FIG. 1, there is illustrated the circuit details of an embodiment of a peak-limiter circuit 10 which is utilized to limit the peak current being supplied in any one of the phases of a three-phase power supply system feeding electrical energy to a rectified load. It is to be understood that any number of phases may be utilized and three phases have been selected for illustrative purposes only. The three-phase power supply is interconnected with a plurality of current transformers for sensing the phase current and the transformers are connected to supply current signals to a plurality of semiconductor diode bridges 12, 14 and 16. An example of a diode bridge which may be utilized in connection with the present invention is illustrated in copending application of James H. Galloway, Ser. No. 88,254, filing date Nov. 10, 1970, and entitled Instrumentation for Providing an Electrical Characteristic Quantity Readout, this latter application being filed on even date with the instant application.

The output of diode bridges 12, 14 and 16 are connected to parallel resistor networks 18, 20 and 22 which form burden resistances for the current transformers. One side of each resistor network is connected to a common negative conductor 50 while the other side of the networks 18, 20 and 22 are connected to the base electrodes of NPN junction transistors 24, 26 and 28 respectively.

Transistors 24, 26 and 28 are connected as a differential comparator with each phase when interconnected as illustrated with a further NPN junction transistor 30. Logically, transistors 24, 26 and 28 are connected in an OR gate configuration. The emitters of transistors 24, 26 and 28 are connected in parallel to node 32 which is in turn connected to the negative supply terminal through resistor 34, the resistor 34 acting as a common-emitter resistor for the differential comparator.

The emitter of the NPN junction transistor 30 is connected to the node 32 through a resistor 36, which resistor limits the gain of differential comparator to provide stable operation for the comparator. The base of transistor 30 is connected to the interconnection 38 between potentiometer 40 and a resistor 42, the resistor 42 being connected to a positive direct-current voltage source at node 44, this latter node being connected to the positive voltage supply terminal 46 through a dropping resistor 48. The opposite end of the potentiometer 40 is connected to a common negative conductor 50, the potentiometer 40 and a resistor 42 forming a variable voltage divider network to provide a variable reference voltage to the base electrode of transistor 30.

The collectors of transistors 24, 26 and 28 are connected in parallel to a node 52, the node being connected to the common positive source 44 through a diode 54 and a resistor 56, the diode 54 being utilized to compensate for temperature variations. The base of the transistor 58 is also connected to the node 52 and its emitter electrode is connected to the positive source at 44 through a resistor 60. The collector of the transistor 58 is connected through an interconnection at point 62 which forms the connection of the upper ends of a resistor 64 and a capacitor 66, the combination forming an RC timing network during the conductive cycle of the transistor 58. The upper end of the resistor 64 is connected to an output conductor 70 through a resistor 68.

The base of transistor 74 is connected to the node 60 through a resistor 82, the resistor 82 being utilized as current-limiting resistor for the base-emitter circuit of transistor 74.

The transistor 74 is connected in an emitter-follower configuration, the emitter electrode thereof being connected to output conductor 70 and the collector being connected to the positive voltage source 44 through a resistor 83. The conduction of transistor 74 controls the conduction of a transistor 84 through a connection between the base electrode of transistor 84 and the collector electrode of transistor 74. The transistor 84 has its collector electrode connected to an RC timing network, including capacitor 87 and resistor 88 connected to the negative conductor 50, and the emitter electrode is connected to the positive conductor through a resistor 85.

Resistors 83 and 85, together with transistor 84, form a source of controlled current to charge capacitor 87. The transistor 86 is connected in a Darlington configuration with transistor 89 with the emitter of transistor 89 being connected to the negative conductor 50 through a resistor 90 and the collector-emitter circuit controlling current flow through a coil 91 of relay device 92. The relay 92 is utilized to control the operation of the main circuit-breaker trip coils to control the main flow of energy to the load. Current through the coil 91 is limited by means of a resistor 93 and a diode 94 is provided in parallel circuit with the coil 91 to provide a short circuit path for the kickback current from coil 91. A pair of zener diodes 95 and 96 are provided to control the voltage between the positive upper conductor 44 and the conductor 50 and the potential between the conductor 50 and the lower conductor 33.

In operation, inputs from the current transformers supply input current signals to the diode bridges 12, 14 and 16, these signals being fed through the resistor networks 18, 20 and 22 to the comparison circuit including transistors 24, 26 and 28. These signals are compared to the signal being fed to the base electrode of transistor 30, by means of potentiometer 40, to provide a phase-by-phase comparison of the input signals with the reference potential.

The input current signal is compared with the reference signal and when the peak current on any phase rises above the reference level, the respective transistor 24, 26 or 28 is turned on. Current is then drawn through the resistor 56 and diode 54 creating a voltage drop across these elements, which voltage drop is applied to the transistor 58 through its base electrode. The conduction of transistor 58 causes capacitor 66 to charge, with the upper plate more positive than the lower plate. Normally, capacitor 66 is totally discharged by means of resistor 64, the starting potential for the capacitor 66 being dictated by the potential at conductor 33. As the capacitor 66 charges, transistor 74, acting as an emitter follower, pulls the negative voltage of the output signal towards zero potential thereby shutting off the trigger circuit of the main rectifier and phasing back the silicon-controlled rectifiers to their nonconducting mode. For a complete description of a three-phase rectifier system such as might be utilized in conjunction with the peak-current limiting circuit described above, reference is made to the aforementioned copending application Ser. No. 5,069.

As the sensed overcurrent subsides, due to the phasing back of the firing angles of the controlled rectifiers, transistor 58 is rendered nonconductive and capacitor 66 discharges through resistor 64. The output signal then returns to its normal state. However, this return is not immediate but returns at a rate which is dictated by the parameters of the RC timing circuit formed by resistor 64 and capacitor 66. It should be noted that resistor 68 serves to place and maintain an initial charge on capacitor 66 just slightly above the normal operating output signal in order to insure a fast-switching operation and minimuze the time for phasing back the firing circuits.

In the event automatic self-recovery, as described above, cannot be effected due to the persistence of the fault condition, transistors 58 and 74 are maintained in a conductive condition and the collector current of transistor 74 switches the transistor 84 on. The conduction of transistor 84 causes the charging of capacitor 87 in accordance with the RC time delay created by the parallel combination of capacitor 87 and resistor 88. The conduction of transistor 84 causes current to flow through Darlington configuration 86 at such time as the charging of capacitor 87 achieves a level sufficient to cause the conduction of transistors 86 and 89. Obviously, the conduction of transistor 89 energizes coil 91 to cause the circuit breakers in the main supply circuit to open thereby breaking the connection between the source of energy and the load.

If the overcurrent condition originally sensed is reduced during the time-delay period before relay 91 is operated, the transistors 58, 74 and 84 are rendered nonconductive. The nonconduction of these transistors permits capacitor 87 to discharge through resistor 88 to prevent the relay coil from being energized. In this case, normal rectifier operation is resumed.

Referring now to the upper right-hand portion of FIG. 1, there is illustrated a common power supply 100 for the isolated sections of the current and voltage isolation circuits. The power supply 100 includes a secondary transformer winding input 102 which is magnetically coupled to a primary winding, to be described in conjunction with FIG. 2, through a magnetic core 104. The secondary winding includes a center-tap conductor 106 which forms the common conductor for the entire circuit of the upper right-hand portion of FIG. 2 and also forms the common conductor to be described in conjunction with FIGS. 2 and 3.

The opposite ends of the transformer 102 are connected to conductors 108 and 110 which feed a diode bridge circuit 112 to provide a negative output signal from the diode bridge at an output conductor 114 and a positive signal on conductor 116. The wave forms on conductor 116, relative to the common conductor 106, are filtered by means of a capacitor 118 and the wave form between common conductor 106 and negative conductor 114 is filtered by means of a capacitor 120.

The voltage between positive conductor 116 and common conductor 106 is regulated and the current is limited by means of a voltage regulator and current-limiting integrator circuit 124, which is preferably of the type 723 presently being marketed by the Fairchild Corporation. The voltage regulator circuit 124 includes inputs to input terminals 7 and 8 and the output is provided from terminal one to a conductor 126 and from terminal 5 to a conductor 128. Thus, the voltage between conductors 126 and 128 is highly regulated at a preselected value, for example a positive ten volts.

A current-sensing resistor is provided between output terminals 6 and 10 and the conductor 126 by means of a resistor 130. A second resistor 132 is provided to insure impedance balance and a frequency compensation capacitor 134 is interconnected between terminals 2 and 9. Thus, a highly regulated positive voltage is developed across a pair of resistors 136, 138 which are connected in series circuit between a positive conductor 140 and the common conductor 106. This output is again filtered by means of a filter capacitor 142.

The negative potential is developed at a negative terminal 146 through a current-limiting resistor 148. The voltage at the negative conductor 146 is held at a preselected negative value below common conductor 106 by the combination of an operational amplifier circuit 150 connected in controlling relation with a shunt regulator transistor 152 through a current-limiting resistor 154.

The negative input circuit to the operational amplifier 150 is connected to the negative conductor 146 by means of a resistor 158 and the positive terminal of the operational amplifier 150 is connected to the common conductor 106 through a resistor 160. Thus, the operational amplifier 150 senses the voltage between conductors 106 and 146. If conductor 146 attempts to go more negative then the desired negative potential, the operational amplifier 150 conducts to a greater degree to cause transistor 152 to conduct more, thereby drawing the negative potential at conductor 146 nearer the common conductor 106. Contrariwise, if the voltage at conductor 146 draws nearer the voltage at the common conductor 106, the operational amplifier 150 conducts to a lesser degree thereby causing transistor 152 to conduct less. This draws the voltage at conductor 146 away from the common conductor 106.

Figure 2:
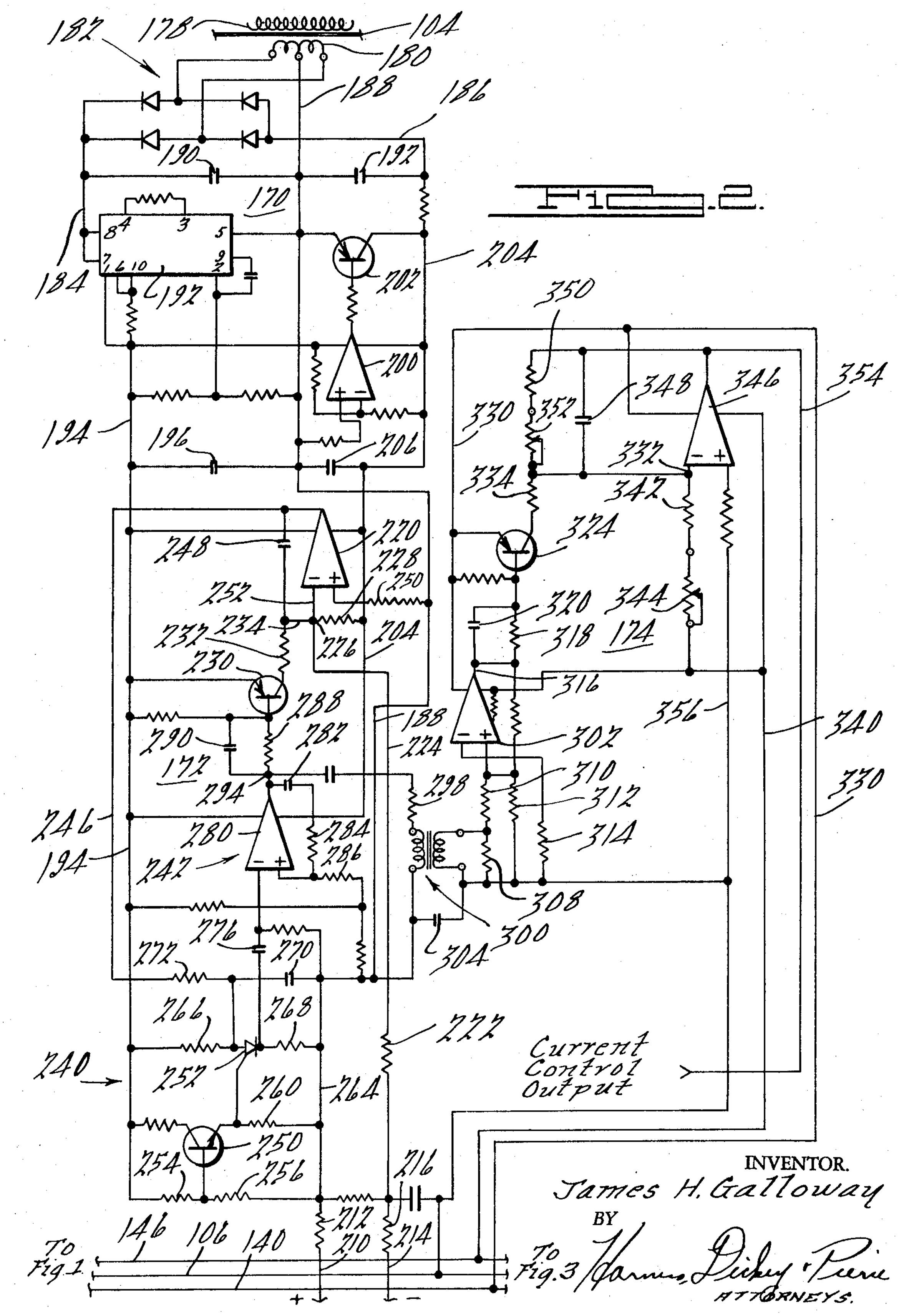
FIG. 2 is a schematic diagram illustrating the isolating circuit for a current control signal.

Referring now to FIG. 2, there is illustrated a power supply section 170, which is identical to that described in conjunction with the upper right-hand portion of FIG. 1, a voltage to frequency to duty-cycle converter section 172 and a duty cycle to voltage converter section 174. The section 174 is magnetically coupled to, but isolated from the voltage to duty-cycle converter section and produces an output voltage proporational to the input voltage being fed to the section 172. The power supply described in conjunction with FIG. 1 is utilized to supply the positive and negative supplies to the section 174 and the power supply 170 is utilized to supply power to the converter section 172. The common conductor described in conjunction with FIG. 1 is common to all of the sections 170, 172 and 174.

Referring particularly to the power supply circuit, there is provided a primary input winding 178 which is magnetically coupled to a secondary winding 180 through the magnetic core described in conjunction with FIG. 1. The primary winding, it will be noted, supplies input energy for the secondary winding 102 of FIG. 1. The output of the secondary winding is fed through a four-way rectifying bridge 182 to provide a positive voltage at a positive conductor 184 and the negative side is connected to a negative conductor 186. The secondary winding is center tapped at 188 and a pair of filter capacitors 190, 192 are provided to filter the output from the diode bridge 182. As was the case with FIG. 1, a voltage regulator and current-limiting circuit 192 is provided to generate a highly regulated and current-limited positive voltage at positive conductor 194, this voltage being generated relative to the common conductor 188. The output between the common conductor 188 and positive conductor 194 is filtered by means of a capacitor 196.

As was the case with FIG. 1, the negative voltage is controlled by means of an operational amplifier 200 and a shunt regulating transistor 202 to regulate the negative voltage at a negative conductor 204 relative to the common conductor 188. Again, when the negative voltage at conductor 204 tends to fall more negative than desired, the operational amplifier 200 conducts to a greater degree to cause transistor 202 to conduct further, thereby lessening the emitter-collector voltage drop to draw the voltage at conductor 204 closer to the common conductor 188. The opposite condition occurs when conductor 204 draws nearer in voltage to the common conductor 188 than is desired. The output voltage between the negative conductor and the common conductor is filtered by a capacitor 206.

Referring now to the voltage to duty-cycle converter section 172, there is provided a positive input at an input conductor 210 through a resistor 212 and a negative input at input conductor 214 through a resistor 216. The negative input is fed to an operational amplifier circuit 220 by means of a resistor 222 and a conductor 224, the negative signal being fed to a summing node at 226. The summing node 226 is also provided with an input signal from the negative conductor 204 through a resistor 228 and a further signal is provided from a switching transistor 230 through a resistor 232 and a conductor 234. The signal on conductor 234 is the average current of the duty-cycle signal, as will be more fully explained hereinafter.

However, the node 226 is fed three current signals, the input from the load circuit being sensed, the negative signal on conductor 204 and the average current signal from the duty-cycle generator portion of the circuit. It is desired that the current at the node 226 be an algebraic zero. For purposes of explanation of the operation of the amplifier 220, it should be noted that the circuit 172 includes an oscillator circuit 240 and a single-shot multivibrator circuit 242, the circuit 240 being adapted to be operated at a frequency of 2,000 to 4,000 Hertz and the multivibrator circuit 242 being devised to switch the 2,000 to 4,000 Hertz signal to a duty-cycle signal, the duty cycle varying in direct relationship to the variation in frequency from 2,000 to 4,000 Hertz. The circuit is adjusted such that, at zero voltage input between conductors 210 and 214, the oscillator circuit 240 operates at 2,000 Hertz. On the other hand, the oscillator circuit 240 should operate at 4,000 Hertz at a maximum signal to be measured at conductors 210, 214.

Referring back to the node 226, and assuming that the voltage difference between conductors 210 and 214 is zero and further assuming that the conductor 204 is at a constant negative level, the only other influence on the current flowing through node 226 is the average of the duty-cycle current being supplied by the switching transistor 230. Accordingly, at zero input signal on conductors 210, 214, the output of the operational amplifier 220 is such that the oscillator operates at 2,000 Hertz. The output from the operational amplifier 220 is fed to the oscillator circuit by means of a conductor 246. It is to be noted that the current to the node 226 from the transistor 230 flows toward the node and the current through resistor 228 and in conductor 224 flows away from the node.

Referring further to the operational amplifier 220, it is to be noted that the operational amplifier is interconnected as an integrator due to the connection of a capacitor 248, this integration connection being required because of the pulsing action of the current supplied from transistor 230. Further, the negative input of the operational amplifier 220 is connected to the common conductor 188 through a resistor 250. Thus, the operational amplifier 220 will provide sufficient current flow from the output thereof to insure a zero current flow into the positive input of the operational amplifier, the positive input being supplied from conductor 252. This current flow is exhibited in conductor 246 and develops a signal for the oscillator 240 to vary the operation of the oscillator 240 in accordance with the range of 2,000 to 4,000 Hertz for, for example, a zero to 5 volt input or a zero to 50 millivolt input, the latter being the case of the current isolator section presently being described.

Referring now to the oscillator circuit 240 it is seen that the oscillator comprises primarily an emitter follower transistor 250 and a programmable unijunction transistor 252. The conduction of the transistor 250 is controlled by a resistive voltage divider including a pair of resistors 254, 256 connected to the upper end of the positive resistor 212. The conduction of the transistor 250 establishes a current through a resistor 260 connected to the gate electrode of the programmable unijunction transistor to establish a voltage level for the gate electrode. The transistor acts as a high impedance under these conditions, which is a requirement for the triggering of the programmable unijunction transistor 252.

The anode-cathode circuit of the unijunction transistor 252 is connected between the positive source of potential at conductor 194 and a conductor 264 connected to the upper end of the resistor 212 through a pair of resistors 266, 268. As was stated above, transistor 250 establishes a voltage level for the gate electrode of the unijunction transistor 252 and the anode voltage is established by means of the charge developed on a capacitor 270. The capacitor 270 is charged from the output circuit of the integrated circuit 220, the capacitor 270 being connected thereto by means of the conductor 246 and a resistor 272. Thus, the resistor 272 and the capacitor 270 form an RC timing circuit for the voltage established at the anode electrode of the unijunction transistor 252. When the charge on capacitor 270 is sufficient to trigger unijunction transistor 252, the gate electrode of transistor 252 is pulled toward ground which, in turn, pulls the emitter electrode of the transistor 250 toward ground. This presents a relatively low impedance to the unijunction transistor 252 to cause the transistor to cease conduction.

When the voltage across conductors 210 and 214 is zero, the current flowing in conductor 246 is such to charge capacitor 270 and, when the voltage across the capacitor is sufficient to cause conduction of the unijunction transistor 252, the oscillator will operate at a frequency of 2,000 Hertz. As the voltage differential across the conductors 210, 214 increases from zero, the current flow in conductor 246 increases to cause capacitor 270 to charge to the triggering level in a shorter period of time. Thus, the frequency of triggering of the unijunction transistor 252 increases to a 4,000 Hertz level when the voltage across the conductors 210, 214 is at a maximum.

The output of the transistor 252 is taken at its cathode electrode and coupled, through a capacitor 276, to the input circuit of a single-shot multivibrator circuit 280. The time of the pulse generated by the single-shot multivibrator is determined by a capacitor 282 and resistors 284, 286. Thus, each pulse from the oscillator circuit, as fed through the capacitor 276, creates a wide constant width pulse at the output of the single-shot multivibrator circuit 280.

The output of the single-shot multivibrator circuit 280 is coupled to the base electrode of the transistor 230 through a resistor 288 and a capacitor 290, the capacitor 290 being a speed-up capacitor. The transistor 230 acts as a semiconductor switch to close the loop to the integrated circuit 220 by switching the positive supply on and off to supply the feedback current to the integrated circuit 220. It is to be noted that the single-shot multivibrator circuit provides an output pulse at a node 294 which switches from a zero level to a negative level, the negative level occurring during the energization or operation of the multivibrator circuit. As is seen from the above description, the faster or higher frequency of the pulses being fed to the multivibrator circuit 280, the greater the duty cycle or percent "on" time relative to total time of the pulse that occurs at the output of the multivibrator circuit 280.

Thus, the multivibrator 280 produces an output pulse each time that a pulse is generated by the unijunction transistor 252. However, the single shot produces a uniform output pulse which does not vary in duration. As is obvious, the greater the frequency of output pulses from the transistor 252, the shorter the total time available for each pulse of the successive train of pulses from the circuit 280. Thus, while the "on" time of each pulse is fixed, the total time varies (is shorter) as the frequency increases. Thus, the duty cycle or "on" time relative to total time increases with an increase in frequency.

The output from the multivibrator circuit 280 is fed through a resistor 298 and capacitor 299 to the primary circuit of a pulse transformer 300, the secondary being connected to provide a signal to a flip-flop circuit 302. The pulse transformer has the lower ends of the primary and secondary connected together through a capacitor 304, the pulse transformer electrically isolating the section 174 from the section 172.

The capacitor 299 acts as a differentiator whereby the start of the pulse from the multivibrator circuit 280 produces a negative-going pulse in the secondary winding of transformer 300 particularly across a resistor 308 and a positive-going pulse is generated at the end of the output pulse from the multivibrator circuit 280. The positive and negative-going pulses alternately set and reset the flip-flop circuit through inputs including the input resistors 310, 312 and 314 connected to the positive and negative inputs to the flip-flop circuit 302. Thus, the output signal at the output conductor 316 is an exact replica or duplicate of the pulse produced at node 294.

The output of the flip-flop circuit 302 is fed to a resistive capacitive combination in the form of a resistor 318 and a capacitor 320, the resistor forming the coupling to the base electrode of an output transistor 324 and the capacitor 320 being a speed-up capacitor similar to the capacitor 290. The transistor 324 is alternately turned on and off to connect the positive potential at conductor 330 with a current summing node 332 through a resistor 334. The summing node 332 is also fed current from a negative conductor 340 which is connected to the negative conductor 146 through a resistor 342 and a potentiometer 344.

The node 332 is interconnected with the positive input of an output operational amplifier 346, the operational amplifier 346 including a feedback circuit having a capacitor 348, a fixed resistor 350 and a variable resistor 352. The resistor 352 is variable to provide an adjustment for the output of the operational amplifier such that a full-scale signal is produced when the input being supplied at conductors 210 to 214 is at rated full scale. Potentiometer 344 is variable to adjust the output of operational amplifier 346 to zero at the duty cycle produced when the input at conductors 210 and 214 is zero. The other input to the operational amplifier is provided with a signal on an input conductor 356 which is connected to the common conductor 106. The output from the operational amplifier 346 as provided on conductor 354 serves as the feedback link to the control circuit for controlling the current being fed to the load.

Figure 3:
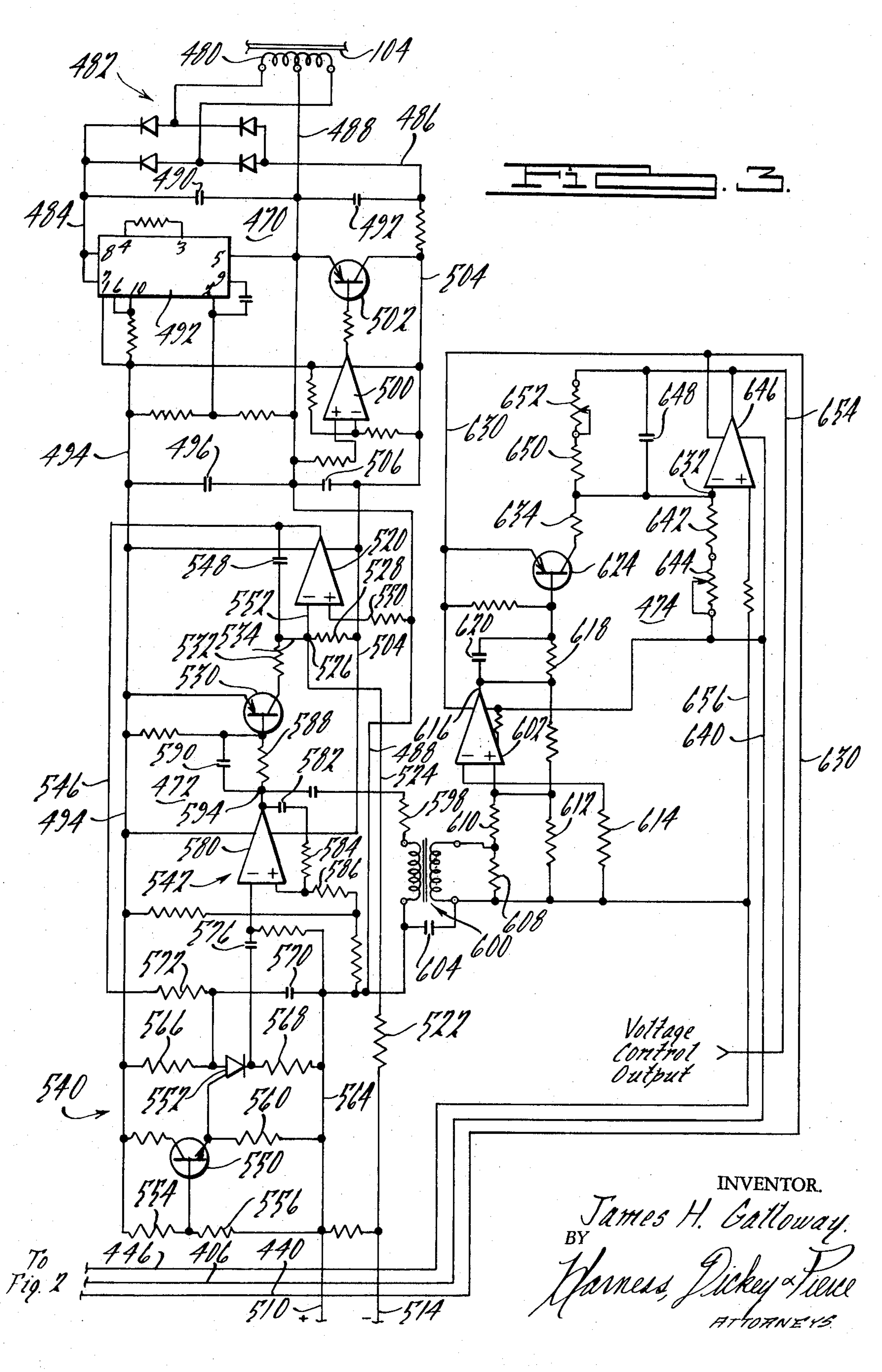
FIG. 3 is a schematic diagram, substantially identical to FIG. 2, illustrating a voltage isolation portion of this system.

Referring now to FIG. 3, there is illustrated a power supply section 470, which is identical to that described in conjunction with the upper right-hand portion of FIG. 1 and FIG. 2, a voltage to frequency to duty-cycle converter section 472 and a duty cycle to voltage converter section 474, the section 474 is magnetically coupled to, but isolated from the voltage to duty-cycle converter section and produces an output voltage proportional to the input voltage being fed to the section 472. The power supply described in conjunction with FIG. 1 is utilized to supply the positive and negative supplies to the section 472 and 474 and the common conductor described in conjunction with FIG. 1 is common to all of the sections 470, 472 and 474.

Referring particularly to the power supply circuit, there is provided a primary input winding 478 which is magnetically coupled to a secondary winding 480 through the magnetic core described in conjunction with FIG. 1. The output of the secondary winding is fed through a four-way rectifying bridge 482 to provide a positive and negative voltage at conductors 484 and 486. The secondary winding is center tapped at 488 and a pair of filter capacitors 490, 492 are provided to filter the output from the diode bridge 482. As was the case with the previous figures, a voltage regulator and current-limiting circuit 492 is provided to generate a highly regulated and current-limited positive voltage at positive conductor 494, this voltage being generated relative to the common conductor 488. The output between the common conductor 488 and positive conductor 494 is filtered by means of a capacitor 496.

The negative voltage is controlled by means of an operational amplifier 500 and a shunt regulating transistor 502 to regulate the negative voltage at a negative conductor 504 relative to the common conductor 488. Again, when the negative voltage at conductor 504 tends to fall more negative than desired, the operational amplifier 500 conducts to a greater degree to cause transistor 502 to conduct further.

Referring now to the voltage to duty-cycle converter section 472, there is provided a positive input at an input conductor 510 through a resistor 512 and a negative input at input conductor 514 through a resistor 516, these inputs being derived from a resistive divider connected to sense the load voltage and produce an input signal of zero to 5 volts. The negative input is fed to an operational amplifier circuit 520 by means of a resistor 522 and a conductor 524, the negative signal being fed to a summing node at 526. The summing node 526 is also provided with an input signal from the negative conductor 504 through a resistor 528 and a signal is provided from a switching transistor 530 through a resistor 532 and a conductor 534. The signal on conductor 534 is the average current of the duty-cycle signal.

However, the node 526 is fed three current signals, the input from the load circuit being sensed, the negative signal on conductor 504 and the average current signal from the duty-cycle generator portion of the circuit. The circuit 472 includes an oscillator circuit 540 and a single-shot multivibrator circuit 542, the circuit 540 also being adapted to be operated at a frequency of 2,000 to 4,000 Hertz, the duty-cycle of the multivibrator varying in direct relationship to the variation in frequency from 2,000 to 4,000 Hertz. Referring back to the node 526, and assuming that the voltage difference between conductors 510 and 514 is zero and further assuming that the conductor 504 is at a constant negative level, the only other influence on the current flowing through node 526 is the average of the duty-cycle current being supplied by the switching transistor 530. Accordingly, at zero input signal on conductors 510, 514, the output of the operational amplifier 520 is such that the oscillator operates at 2,000 Hertz. The output from the operational amplifier 520 is fed to the oscillator circuit by means of a conductor 546.

Referring further to the operational amplifier 520, it is to be noted that the operational amplifier is interconnected as an integrator due to the connection of a capacitor 548, this integration connection being required because of the pulsing action of the current supplied from transistor 530. The operational amplifier 520 will provide sufficient current flow from the output thereof to insure a zero current flow into the positive input of the operational amplifier, the positive input being supplied from conductor 552. This current flow is exhibited in conductor 546 and develops a signal for the oscillator 540 to vary the operation of the oscillator 540 in accordance with the range of 2,000 to 4,000 Hertz for, for example, a zero to 5 volt input or a zero to 50 millivolt input, the latter being the case of the voltage isolator section presently being described.

Referring now to the oscillator circuit 540 it is seen that the oscillator comprises primarily an emitter-follower transistor 550 and a programmable unijunction transistor 552. The conduction of the transistor 550 is controlled by a resistive voltage divider including a pair of resistors 554, 556 connected to the upper end of the positive resistor 512. The conduction of the transistor 550 establishes a current through a resistor 560 connected to the gate electrode of the programmable unijunction transistor to establish a voltage level for the gate electrode. The transistor acts as a high impedance prior to triggering, which is a requirement for the triggering of the programmable unijunction transistor 552.

The anode-cathode circuit of the unijunction transistor 552 is connected between the positive source of potential at conductor 491 and a conductor 564 connected to the upper end of the resistor 512 through a pair of resistors 566, 568. A capacitor 570 is charged from the output circuit of the integrated circuit 520, the capacitor 570 being connected thereto by means of the conductor 546 and a resistor 572. Thus, the resistor 572 and the capacitor 570 form an RC timing circuit for the voltage established at the anode electrode of the unijunction transistor 552. When the charge on capacitor 570 is sufficient to trigger unijunction transistor 552, the gate electrode of transistor 552 is pulled toward ground which, in turn, pulls the emitter electrode of the transistor 552 toward ground to present a relatively low impedance to the unijunction transistor 552 to cause the transistor to cease conduction.

When the voltage across conductors 510 and 514 is zero, the current flowing in conductor 546 is such to charge capacitor 570 and, when the voltage across the capacitor is sufficient to cause conduction of the unijunction transistor 552, the oscillator will operate at a frequency of 2,000 Hertz. As the voltage differential across the conductors 510, 514 increases from zero, the current flow in conductor 546 increases to cause capacitor 570 to charge to the triggering level in a shorter period of time. Thus, the frequency of triggering of the unijunction transistor 552 increases to a 4,000 Hertz level when the voltage across the conductors 510, 514 is at a maximum.

The output of the transistor 552 is coupled, through a capacitor 576, to the input circuit of a single-shot multivibrator circuit 580. The time of the pulse generated by the single-shot multivibrator is determined by a capacitor 582 and resistors 584, 586. Thus, each pulse from the oscillator circuit, as fed through the capacitor 576, creates a wide constant width pulse at the output of the single-shot multivibrator circuit 580.

The output of the single-shot multivibrator circuit 280 is coupled to the base electrode of the transistor 530 through a resistor 588 and a capacitor 590, the capacitor 590 being a speed-up capacitor. The transistor 530 acts as a semiconductor switch to close the loop to the integrated circuit 520 by switching the positive supply on and off to supply the feedback current to the integrated circuit 520. As was the case with FIG. 2, the single-shot multivibrator circuit provides an output pulse at a node 594 which switches from a zero level to a negative level, the negative level occurring during the timing cycle of the multivibrator circuit. The multivibrator 580 produces an output pulse each time that a pulse is generated by the unijunction transistor 552. However, the single shot produces a uniform output pulse which does not vary in duration. As is obvious, the greater the frequency of output pulses from the transistor 552, the shorter the total time available for each pulse of the successive train of pulses from the circuit 580. Thus, while the "on" time of each pulse is fixed, the total time varies as the frequency increases. Thus, the duty cycle or "on" time relative to total time increases with an increase in frequency.

The output from the multivibrator circuit 580 is fed through a resistor 598 through a capacitor to the primary circuit of a pulse transformer 600, the secondary being connected to provide a signal to a flip-flop circuit 602. The pulse transformer has the lower ends of the primary and secondary connected together through a capacitor 604, the pulse transformer electrically isolating the section 474 from the section 472. The capacitor acts as a differentiator whereby the start of the pulse from the multivibrator circuit 580 produces a negative-going pulse in the secondary winding of transformer 300, particularly across a resistor 608, and a positive going pulse is generated at the end of the output pulse from the multivibrator. The positive and negative-going pulses alternately set and reset the flip-flop circuit through inputs including the input resistors 610, 612 and 614 connected to the positive and negative inputs to the flip-flop circuit 602. Thus, the output signal at the output conductor 616 is an exact replica or duplicate of the pulse produced at node 594.

The output of the flip-flop circuit 602 is fed to a resistive capacitive combination in the form of a resistor 618 and a capacitor 620, the resistor forming the coupling to the base electrode of an output transistor 624 and the capacitor 620 being a speed-up capacitor similar to the capacitor 590. The transistor 624 is alternately turned on and off to connect the positive potential at conductor 630 with a current summing node 632 through a resistor 634. The summing node 632 is also fed current from a negative conductor 640 which is connected to the negative conductor 446 through a resistor 642 and a potentiometer 644.

The node 632 is interconnected with the positive input of an output operational amplifier 646, the operational amplifier 646 including a feedback circuit having a capacitor 648, a fixed resistor 650 and a variable resistor 652. The resistor 652 is variable to provide a full-scale adjustment for the output of the operational amplifier such that a full-scale signal is produced when the input being supplied at conductors 210 to 214 is at rated full scale. Potentiometer 644 is variable to adjust the output of operational amplifier 646 to zero at the duty cycle produced when the input at conductors 510 and 514 is zero. The other input to the operational amplifier is provided with a signal on an input conductor 656 which is connected to the common conductor 406. The output from the operational amplifier 646 as provided on conductor 654 serves as the feedback link to the control circuit for controlling the current being fed to the load.

Figure 4:
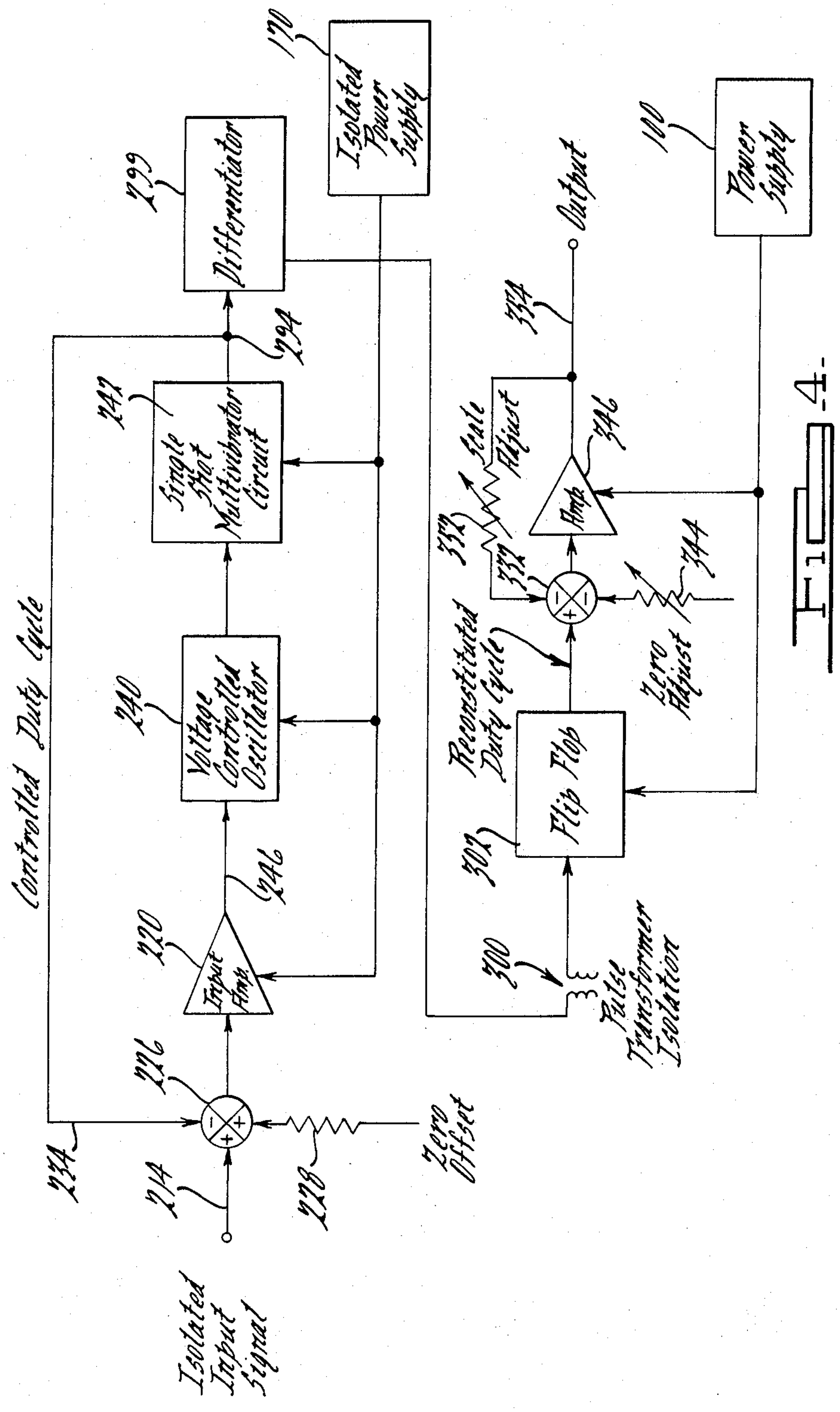
FIG. 4 is a block diagram illustrating the upper right hand portion of FIG. 1 and FIG. 2 in block form.

Referring now to FIG. 4, there is illustrated a block diagram which simplifies the illustration of the detailed schematic diagram illustrated in the upper right hand section of FIG. 1 and the entirety of FIG. 2 or the corresponding subsystems of the upper right hand corner of FIG. 1 and FIG. 3.

Referring specifically to FIG. 4, the input signal, in this case the negative voltage, is fed to input conductor 214, the conductor 214 being connected to the node 226. The node 226, in addition to being fed the negative input, is also fed a zero offset signal by means of the resistor 228 and the controlled duty-cycle signal by means of the conductor 234. The signal on conductor 234 is the average current of the duty-cycle signal as described above. As further described above, it is desired that the current at the node 226 be maintained at an algebraic zero level. The output from the node 226 is fed to the input circuit of an amplifier 220. The output from the amplifier being fed, in turn, to an oscillator circuit 240 and a single shot multivibrator circuit 242. The oscillator circuit 240 is devised to be operated at a frequency of 2,000 to 4,000 hertz. The multivibrator circuit 242 converts the 2,000 to 4,000 hertz signal to a variable duty-cycle signal, the duty-cycle varying in accordance with the variations in frequency generated by the oscillator 240. The circuit is adjusted such that, at zero input voltage, the oscillator circuit will operate at 2,000 hertz. On the other hand, the oscillator circuit 240 will operate at 4,000 hertz at the maximum signal to be measured at input conductor 214.

It will be noted, that the output from the single shot multivibrator circuit 242 is fed back to the node 226 to provide the additional signal to the node 226. The output of the single shot multivibrator circuit 242 is also fed to a differentiator circuit 299, the input pulses to the differentiator circuit being a function of the varying input signal. Thus, the higher the frequency of the pulses being fed to the multivibrator circuit 242, the greater the duty-cycle or percent "on" time relative to the total time of the output pulse.

The output of the differentiating circuit is fed to an isolation pulse transformer 300, the secondary of the pulse transformer being fed to the input circuit of the flip flop 302. The pulses from the transformer 300 are utilized to alternately set and reset the flip flop 302. Thus, the output of the flip flop is an exact reproduction of the duty-cycle signal generated at node 294.

The system includes an output operational amplifier 346 which converts the variable duty-cycle signal to an output voltage which varies as a function of the input signal at conductor 214. The circuit may be adjusted to provide a one-to-one ratio of output to input signal or some other ratio. The scale adjust for the amplifier 346 is provided by a variable resistor 352 which feeds the output of amplifier 346 back to the node 332. Also, a zero adjust signal is provided to node 332 by means of variable resistor 344. The power supply for the upper hand section of FIG. 4 is provided by an isolated power supply 170 and the power supply for the lower section is provided by power supply 100.

While it will be apparent that the preferred embodiments of the invention disclosed are well calculated to fulfill the objects above stated, it will be appreciated that the invention is susceptible to modification, variation and change without departing from the departing from the proper scope or fair meaning of the subjoined claims.

What is claimed is:

1. In a power supply system having a circuit for transmitting electrical energy from a source to a load, sensing circuit means associated with the transmitting circuit for sensing selected electrical characteristics of the transmitting circuit, control circuit means connected in responsive relation to said sensing circuit for controlling the selected characteristics of the energy and an isolation circuit for electrically isolating the control circuit from the sensing circuit, the isolating circuit comprising oscillator circuit means for generating a signal having a frequency which varies in response to variations in the electrical characteristic being sensed, pulse circuit means connected to said oscillator circuit means for producing variable duty cycle pulses in response to variations in frequency of said pulse producing circuit means, feedback circuit means connected to respond to sensed characteristics and connected to said pulse-producing circuit means and said oscillator circuit means to vary the frequency of the signal in response to variations in said sensed characteristic, and output circuit means electrically isolated from said duty cycle-producing means and responsive thereto to reproduce said duty cycle pulses in said output circuit, said output circuit being transformer coupled from said pulse circuit means, said pulse circuit means including a multivibrator circuit having a fixed "on" time and a variable total time, the duty cycle of said pulses from said pulse circuit means varying in accordance with the input signal from said sensing circuit means, said oscillator circuit including a voltage responsive semiconductor device and circuit means for producing a preset voltage signal, said input signal from said sensing circuit varying one of said voltage signals, said preset voltage being established by an active semiconductor device producing a voltage level when said oscillator circuit is oscillating and in a first state, said oscillator circuit including a programmable unijunction transistor having a gate electrode connected to said active semiconductor device.

2. The improvement of claim 1 wherein said active semiconductor device presents a relatively high impedance to the gate electrode of said unijunction transistor to cause triggering of said unijunction transistor.

3. The improvement of claim 2 wherein said oscillator circuit operates at a preselected frequency range greater than zero including a zero input signal from said sensing circuit means.

4. The improvement of claim 3 wherein said frequency of said oscillator circuit increases with increases in input signal from said sensing circuit means.

5. The improvement of claim 4 wherein the duty cycle of said pulse circuit means increases with increases in frequency, said feedback circuit means being connected to increase the frequency of said oscillator circuit means in response to increases in said input signal.

6. The improvement of claim 5 wherein said input to said oscillator circuit from said feedback circuit means comprises a variable voltage signal, said oscillator circuit means including a resistive capacitive timing circuit connected to said feedback circuit means.

7. The improvement of claim 6 wherein said unijunction transistor includes an input signal in response to the charge level on said capacitor, the signal in said feedback circuit varying the supply signal to charge said capacitor.

8. The improvement of claim 7 wherein said timing circuit, including said capacitor, is connected to the anode electrode of said unijunction transistor, said unijunction transistor being rendered conductive when the charge on said capacitor exceeds a preselected level.

9. The improvement of claim 8 wherein said active semiconductor device includes a transistor having a collector emitter circuit connected to the gate electrode of said unijunction transistor, the conduction of said unijunction transistor presenting relatively low impedance to said gate circuit to cause said unijunction transistor to cease conduction.

10. The improvement of claim 9 wherein the output of said unijunction transistor is connected to the input circuit of said multivibrator circuit, said multivibrator circuit initiating the output pulse in response to the conduction of said unijunction transistor.

11. The improvement of claim 10 wherein said output pulse is of fixed duration and the generation of the next pulse from said oscillator circuit terminates the total time of a cycle from said multivibrator circuit, said total time and thus said duty cycle varying in response to the frequency of said oscillator.

12. The improvement of claim 11 wherein said feedback circuit includes a switch and an integrating circuit, said switch and said integrating circuit providing an average current in said feedback circuit to correspond to said frequency.

13. The improvement of claim 12 wherein said feedback circuit includes a current summing node, said current summing node including input currents from said sensing circuit and from said multivibrator circuit.

14. The improvement of claim 13 wherein the current in said feedback circuit to said charging circuit is a function of both said average current and said input signal current.

15. The improvement of claim 1 wherein said coupling transformer is differentially coupled to the output of said pulse circuit means for producing first and second output pulses from said transformer means, said first pulse corresponding to the start of the pulse from said multivibrator circuit, and said second pulse corresponding to the end of said multivibrator circuit.

16. The improvement of claim 15 wherein said output circuit includes a bistable circuit having a first and second state connected to said transformer, said first and second pulses switching said bistable means between said stable states.

17. The improvement of claim 16 wherein said bistable circuit means reproduces the pulse from said multivibrator means but electrically isolated therefrom.

18. The improvement of claim 14 wherein said coupling transformer is differentially coupled to the output of said pulse circuit means for producing a first and second output pulses from said transformer means, said first pulse corresponding to the start of the pulse from said multivibrator circuit, and said second pulse corresponding to the end of said multivibrator circuit.

19. The improvement of claim 18 wherein said output circuit includes a bistable circuit having a first and second state connected to said transformer, said first and second pulses switching said bistable means between said stable states.

20. The improvement of claim 19 wherein said bistable circuit means reproduces the pulse from said multivibrator means but electrically isolated therefrom.

* * * * *